(12) United States Patent
Gaertner et al.

(10) Patent No.: US 9,845,163 B2
(45) Date of Patent: Dec. 19, 2017

(54) DISPLAY ASSEMBLY, USE OF A DISPLAY ASSEMBLY, AND AIRCRAFT ASSEMBLY HAVING SUCH A DISPLAY ASSEMBLY

(71) Applicant: Airbus Defence and Space GmbH, Taufkirchen (DE)

(72) Inventors: Jens Gaertner, Hamburg (DE); Philipp Schneider, Augsburg (DE); Daniel Dreyer, Hohenkammer (DE); Anja Karner, Graz (AT); Matthias Oberhauser, Munich (DE)

(73) Assignee: Airbus Defence and Space GmbH, Taufkirchen (DE)

( * ) Notice: Subject to any disclaimer, the term of this patent is extended or adjusted under 35 U.S.C. 154(b) by 0 days.

(21) Appl. No.: 15/297,409

(22) Filed: Oct. 19, 2016

(65) Prior Publication Data
US 2017/0106996 A1 Apr. 20, 2017

(30) Foreign Application Priority Data
Oct. 20, 2015 (EP) .................................... 15190662

(51) Int. Cl.
*G01C 21/00* (2006.01)
*B64D 45/00* (2006.01)

(52) U.S. Cl.
CPC .................................... *B64D 45/00* (2013.01)

(58) Field of Classification Search
CPC ................................. H01L 21/00; H01M 2/00
See application file for complete search history.

(56) References Cited

U.S. PATENT DOCUMENTS

| | | | |
|---|---|---|---|
| 5,575,554 A | 11/1996 | Guritz | |
| 6,490,402 B1 | 12/2002 | Ota | |
| 2004/0190729 A1* | 9/2004 | Yonovitz | G01H 3/14 381/72 |
| 2006/0020713 A1 | 1/2006 | Kobayashi et al. | |
| 2012/0075170 A1* | 3/2012 | Watson | B64D 10/00 345/8 |
| 2012/0116660 A1* | 5/2012 | Sendlinger | G01G 19/07 701/124 |
| 2014/0340877 A1* | 11/2014 | Nelson | F21V 33/0008 362/103 |
| 2015/0231936 A1* | 8/2015 | Keller | B60C 23/0406 340/442 |

FOREIGN PATENT DOCUMENTS

| | | |
|---|---|---|
| DE | 102013111559 | 4/2015 |
| JP | 2004232156 | 8/2004 |
| WO | 2010139991 | 12/2010 |

OTHER PUBLICATIONS

European Search Report, dated Apr. 5, 2016, priority document.

* cited by examiner

*Primary Examiner* — Shirley Lu
(74) *Attorney, Agent, or Firm* — Greer, Burns & Crain Ltd.

(57) ABSTRACT

A display assembly for displaying a parameter of an aircraft, comprising a parameter device and a non-transparent display device. The parameter device for gathering a parameter of the aircraft and/or of an equipment of the aircraft includes a sending unit for sending the parameter. The non-transparent display device is detachable, is configured to display the parameter, and comprises a receiving unit for receiving the parameter. The sending unit transmits the parameter directly to the receiving unit.

13 Claims, 3 Drawing Sheets

DISPLAY ASSEMBLY, USE OF A DISPLAY ASSEMBLY, AND AIRCRAFT ASSEMBLY HAVING SUCH A DISPLAY ASSEMBLY

CROSS-REFERENCES TO RELATED APPLICATIONS

This application claims the benefit of the European patent application No. 15 190 662.5 filed on Oct. 20, 2016, the entire disclosures of which are incorporated herein by way of reference.

BACKGROUND OF THE INVENTION

The invention refers to a display assembly for displaying a parameter of an aircraft that comprises a parameter device for gathering a parameter regarding the aircraft, wherein the parameter device includes a sending unit for sending the parameter. Furthermore, the invention refers to a use of a display device for displaying a parameter of an aircraft. The invention also refers to an aircraft assembly comprising an aircraft and such a display assembly.

Today, a system which helps during missions in mountains are painted rotor blades. The blades have a signal color on the bottom side so the operator and the pilot can see approximately how far the helicopter is away from rock. Nevertheless, the problem is that an estimation of distances is difficult. At the same time, the pilot has to observe the avionic instruments.

Head-up displays and helmet-mounted displays are commercially available and have been state of the art for decades. Head-up displays and helmet-mounted displays are used for displaying information regarding the flight status of an aircraft. However, crew members not aboard the aircraft or operating in the cabin are not equipped with visual aids and are not connected to the aircraft system.

Acoustic warnings block the communication between the crew members and are unidirectional alerts from the system to the operator without the operator being able to access necessary information at all times at one glance.

US 2006/0207139 A1, U.S. Pat. No. 5,575,554 A, and U.S. Pat. No. 6,490,402 B1 show illumination devices for use with an apparel for a user. In particular, ways are disclosed how flexible illumination devices that can be attached to or combined with the apparel can be realized. The flexible illumination devices can be employed to enhance safety of the wearer.

SUMMARY OF THE INVENTION

It is the object of the invention to facilitate a system providing access to relevant parameters of an aircraft to an operator of the aircraft.

The invention refers to a display assembly for displaying a parameter of an aircraft that comprises a parameter device and a display device. The parameter device is configured for gathering a parameter of the aircraft and/or of an equipment of the aircraft and includes a sending unit for sending the parameter. The non-transparent display device is detachable, configured to display the parameter, and comprises a receiving unit for receiving the parameter. The sending unit transmits the parameter directly to the receiving unit.

The aircraft can be any vehicle that is capable of flying and which is able to carry at least one operator. The aircraft is, for example, an airplane or a helicopter.

The operator can be any person who is aboard the aircraft, for example a pilot or a crew member. Additionally, the operator may be a person that works with the aircraft and requires certain parameters of the aircraft for his work. For example, the operator may be a person that attaches or detaches material or human beings to a hook of a winch of the aircraft.

The parameter can be any parameter with which the aircraft, the status of the aircraft, or information regarding the flight of the aircraft, can be specified. The parameter may be expressed in form of a number or by a binary signal. For example, the parameter can be the altitude of the aircraft or the distance of the aircraft to an obstacle, such as an elevation of the ground, a tall building, or a face of a mountain. In addition, the parameter may characterize the engine of the aircraft or the fuel status. Alternatively or additionally, the parameter may characterize the status of an equipment of the aircraft. For example, the parameter can refer to the information whether material or a human being is attached or detached to a hook of a winch of the aircraft.

The equipment of the aircraft may be any device or component which is used or employed in conjunction with the aircraft. For example, an aircraft equipment may be the winch of a helicopter and the parameter can be the length of the cable of the winch or whether the hook of the winch is open or closed.

The sending unit can send the parameter to the receiving unit. That is, the information contained in the parameter can be received by the receiving unit. The parameter is preferably forwarded from the receiving unit to the display device. The display device may display the parameter in any form. For example, the display device displays a number characterizing the parameter. Alternatively or additionally, the display device displays the range in which the current value of the parameter is in.

The display device is preferably attached in a viewing direction of the operator when he requires the information displayed by the display device. For example, if the operator needs to look outside the window of the cockpit and can thus not monitor the displays arranged in the cockpit, the display device is attached to a shoulder of the operator such that he sees the display device when he is looking outside the window of the cockpit. To this end, the display device is configured such that it can be attached to certain locations in or at the aircraft. Alternatively or additionally, the display device is configured such it can be attached to the operator. To this end, the display device is detachable such that is can be removed and preferably attached to different locations.

The display device differs from instruments or screens attached to the cockpit in that these elements are permanently mounted to the aircraft while the display assembly is detachable. For example, the display device may be detachably mounted on top of skids of a helicopter, entrance or ingress steps, multi-purpose pylons and exterior loads, equipment, installations, windows and outer shell of the aircraft.

The display device is non-transparent, preferably opaque. Hence, it is not possible to see through the display device in contrast to the head-up displays or helmet-mounted displays known in the prior art. Hence, the configuration of the display device is simpler such that the display device can be more easily and more cheaply manufactured.

The parameter device may be permanently fixed to the aircraft, in particular to the cockpit of the aircraft. Alternatively, the parameter device and the display device form a single component such that the parameter device is also detachable. The parameter device may be fixably attached to the cockpit of the aircraft. For example, the parameter device may gather different types of parameters from other instruments arranged in the cockpit. Alternatively or additionally, the parameter device may comprise a sensor for determining the parameter.

The sending unit transmits the parameter directly to the receiving unit. Preferably, this means that no intermediate device is arranged between the sending unit and the receiving unit. The communication between the sending unit and the receiving unit may be direct. Hence, the display assembly may not need any further devices for displaying the parameter.

An aircraft operator, such as a pilot, a winch operator, or a load master, may not have visual access at one glance to all necessary parameters during all phases of flight, especially when looking to the outside of the aircraft during situations with high task load. Thus, critical information is not available at all times or the operator must collect information in intervals at non-task-collocated places. For instance, checking the distance for obstacles or gathering aircraft parameters while performing tasks at different points of attention. In this case, the display device may be arranged in the viewing direction of the operator such that the necessary parameter can be constantly checked. Since the display device is detachable, it can be specifically arranged in the required locations, i.e., the viewing directions under high task load, depending on the expected situation. The display assembly can be very flexibly employed.

It is preferred that the display device comprises a hand-held component.

The display device may include several different components that display the parameter. For example, each different component displays a different parameter. Alternatively, each component may display the same parameter.

The hand-held component is preferably configured such that the operator can hold this component of the display device. For example, the hand-held component can be configured such that the operator can hold the hand-held component with one hand. To this end, the hand-held component may comprise a handle or a grip.

It is preferred that the display device comprises an attachment portion configured for attaching the display device to a work clothing of the operator of the aircraft.

Thus, it is possible to attach at least one component of the display device to a work clothing of the operator. To this end, at least a component of the display device may include a hook and loop fastener. For example, one of the hook and loop fastener is attached to the display device while the other of the hook and loop fastener is attached to work clothing of the operator. Hence, this component of the display device can be detachable arranged on the clothing of the operator. Preferably, the attachment of the component of the display device is such that the operator can see the display device when he needs to monitor the parameter. For example, the component of the display device may be attached to a shoulder, an arm, or a thigh of the operator.

It is preferred that the display assembly further comprises a work clothing for an operator of the aircraft to which the display device is attached.

Preferably, the component of the display device is permanently fixed to the work clothing of the operator. Since the work clothing of the operator can be taken off, the display device is still detachable. This has the advantage that the operator is equipped with the display device once he wears work clothing. Alternatively, the work clothing may have one of the loop and hook fastener permanently attached, preferably on several locations such that the operator can choose where the display device is located best for the specific task load. The work clothing may be a vest, a jacket, an overall, a shoe, or pants.

It is preferred that the display device comprises an illumination component that is selectively illuminated if the parameter is in a predetermined range, wherein preferably the illumination component includes one or more light emitting diodes (LED).

The illumination component may be any component that is capable of emitting light. Preferably, the illumination component illuminates when the parameter is in a predetermined range. The predetermined range may be a range that is associated with a critical or dangerous situation regarding the aircraft. For example, the illumination component may illuminate if the distance between the aircraft and an obstacle is so low that it is critical for the aircraft. Alternatively, the illumination component is illuminated when the engine rate or the rate of the descent is within a critical range.

The illumination component may be any component that is capable of emitting light. The illumination component preferably includes one or more light emitting diodes. However, other illumination components such as other types of light bulbs can be used. For example, a red LED is illuminated if the parameter is in a critical range. Alternatively, three light emitting diodes are provided wherein the illumination of only one light emitting diode indicates a safe parameter range, the illumination of two light emitting diodes refer to a critical parameter range, and the illumination of all three light emitting diodes corresponds to a highly critical parameter range. Alternatively, a green, a yellow, and a red light emitting diode are provided wherein the illumination of the red LED indicates a highly critical parameter range, the illumination of the yellow LED refers to a critical parameter range, and the illumination of the green LED corresponds to a safe parameter range.

Alternatively or additionally, the display device, in particular the LED, may flash and/or vary the flashing frequency depending on the range of the parameter. For example, if the parameter is in the nominal or safe parameter range, the display device, in particular the LED, is constantly illuminated or turned off. If the parameter is in the critical parameter range, the display device, in particular the LED, starts flashing. If the parameter is in the highly critical parameter range, the display device, in particular the LED, flashes with increased frequency and/or the intensity of the flashing light is increased. In a preferred embodiment of the given example, at the lower limit of criticality of the parameter range, low flashing frequency is employed while high flashing frequency is used at the upper limit of criticality of the parameter range. Flashing of the display device has the advantage that it is more readily recognized by the operator.

The provision of an illumination component has the advantage that the illumination component is very robust and requires only little power to operate. Furthermore, the illumination component is light weight such that it can be attached to the work clothing of the operator.

It is preferred that the display device comprises a display component that displays the parameter, wherein preferably the display component includes a liquid crystal display (LCD).

Any display that is known in the prior art can be used for displaying the parameter. Preferably, a LCD is used which has the advantage that it is robust and less expensive compared to the head-up displays known from the prior art. Due to the robustness of the LCD, the display device may also be used with a winch operator or a load master.

Additionally or alternatively, the display component may comprise organic light emitting diode (OLED) displays. These types of displays have the advantage that they are flexible and, thus, can be integrated in the work clothing while only minorly changing the flexibility of the work clothing.

The provision of the display component has the advantage that the display component is very robust and requires only little power to operate, especially when using an LCD. Furthermore, the display component is light weight such that it can be attached to the work clothing of the operator.

It may also be possible to use one or more optical fibers as a display device in order to illuminate specific areas of the clothing. The optical fiber may be detachably mounted to the work clothing or, alternatively, the optical fiber is permanently fixed to the work clothing. The displays may dynamically change their illumination intensity according to the surrounding light conditions, thus ensuring an optimum readability/visibility at all times.

It is preferred that the parameter is wirelessly transmitted between the sending unit and the receiving unit.

Hence, in this preferred embodiment, there is a wireless communication between the display device and the parameter device. The wireless communication may be provided by the sending unit and the receiving unit. Due to the wireless communication, the arrangement of a display device is very flexible. Alternatively, the display device comprises a cable or wire that can be connected to the aircraft, for example, via a socket arranged at the aircraft.

Preferably, the display device includes its own power source such as a battery or an accumulator. Hence, the degree of freedom where the display device can be attached to is enhanced.

It is preferred that the parameter device and the display device are arranged in a single component, wherein preferably the parameter device comprises a sensor for measuring the parameter.

Hence, the flexibility of the display assembly is enhanced. For example, the sensor of the parameter device measures whether a snap hook is closed. If it is detected that the snap hook is closed, the information will be displayed by the display device. Hence, the operator sees from a distance if the snap hook is closed. For example, the snap hook is attached to a winch of the aircraft and the operator is located in the aircraft. In this case, the operator sees, without additional information from a third person operating the snap hook that the snap hook, is open or closed.

The invention further refers to the use of displaying a parameter of the aircraft and/or of an equipment of the aircraft, wherein the display device is attached to a work clothing of an operator of the aircraft.

The use of the display device includes the same embodiments and advantages as described in conjunction with the display assembly. In particular, the display device may display the parameter sent from the parameter device.

The invention further refers to an aircraft assembly comprising an aircraft and a display assembly as previously described.

In particular, the aircraft assembly includes all the preferred embodiments and the advantages as described with regard to the display assembly.

It is preferred that the aircraft is a helicopter having a skid, wherein preferably the display device is attached to the skid.

In particular, the display device is detachably attached to the skid. The display device may be configured such that an operator may stand on the display device.

BRIEF DESCRIPTION OF THE DRAWINGS

A preferred embodiment of the invention will be discussed in conjunction with the attached drawings. Therein.

DETAILED DESCRIPTION OF THE PREFERRED EMBODIMENTS

Figure 1:
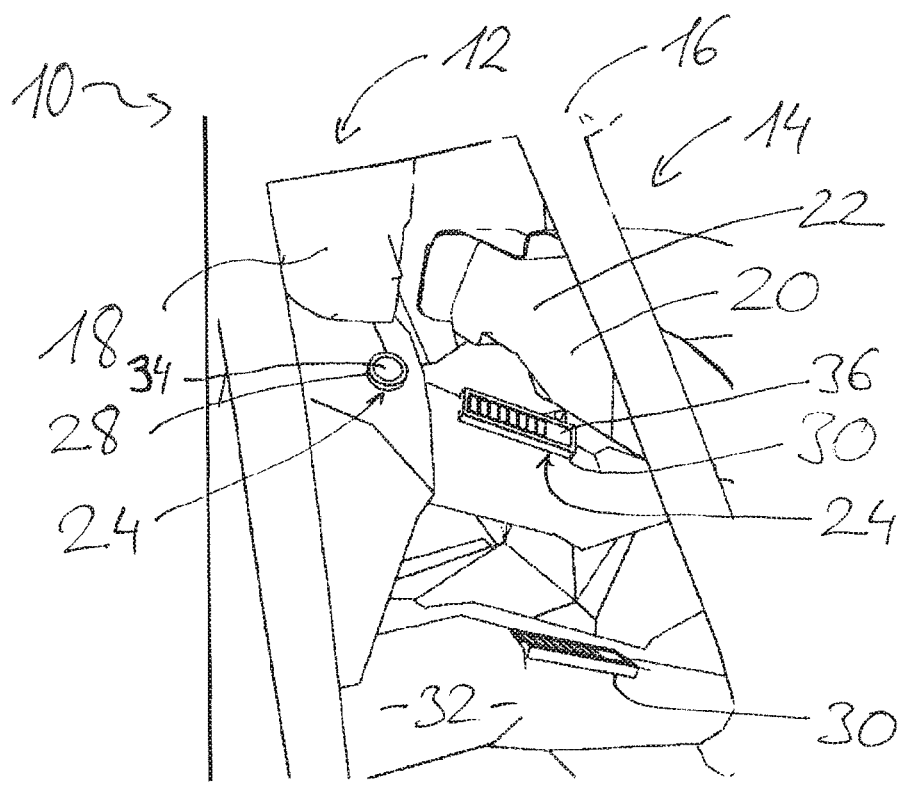
FIG. 1 shows a view inside a cockpit of an aircraft from outside.
Figure 2:
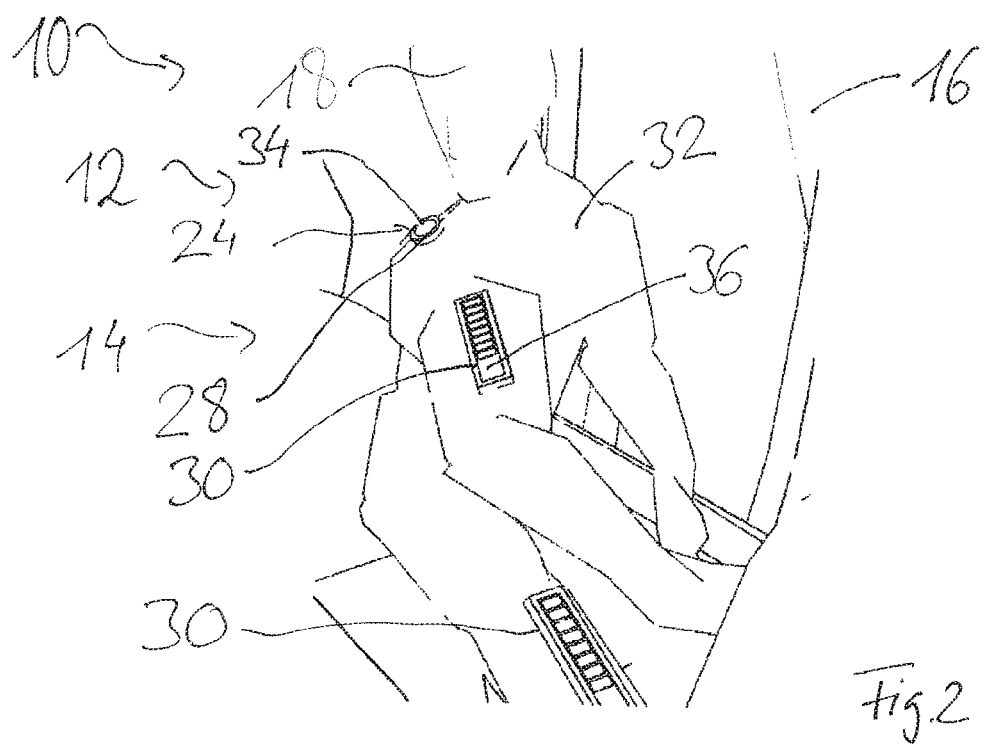
FIG. 2 shows an operator located in the cockpit using a display assembly.

An aircraft assembly 10 comprises an aircraft 12 and a display assembly 14. The aircraft 12 is a helicopter having a cockpit 16 in the embodiment shown in FIGS. 1 to 4. In FIGS. 1 and 2, an operator 18 is located in the cockpit 16. Instruments for operating the aircraft 12 and a screen 20 for monitoring parameters of the aircraft 12 are also arranged in the cockpit 16.

Figure 5:
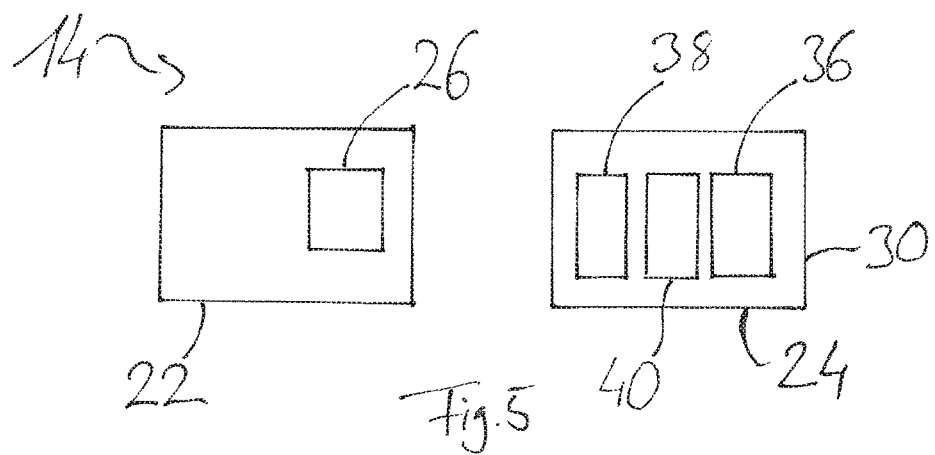
FIG. 5 shows a schematical representation of a parameter device and a display device of the display assembly.

The display assembly 14 comprises a parameter device 22 and a display device 24. The parameter device 22 is fixedly arranged in the cockpit 16 and gathers parameter information regarding the aircraft 12. In particular, the parameter device 22 gathers information regarding the distance of the aircraft 12 towards an obstacle. As schematically shown in FIG. 5, the parameter device 22 comprises a sending unit 26 that is capable of wirelessly transmitting the parameter to the display device 24.

The display device 24 is non-transparent and comprises an illumination component 28 and a display component 30 in the embodiment shown in FIGS. 1 and 2. Both the illumination component 28 and the display component 30 are detachably arranged on a work clothing 32 of the operator 18. In particular, the illumination component 28 is attached to a shoulder of the operator 18 whereas one illumination component 30 is attached to an arm of the operator 18 and the other illumination component 30 is attached to the thigh of the operator 18.

As seen from FIGS. 1 and 2, the display device 24 is arranged in the field of view when the operator 18 is monitoring the outside of the aircraft 12. In particular, the illumination component 28 located on the shoulder of the operator 18 and the display component 30 placed on the arm of the operator 18 are arranged in the field of view of the operator 18 when he looks outside the cockpit 16.

The illumination component 28 and the display component 30 both include an attachment portion (not shown in the figures) with which the components 28, 30 are detachably mounted to the work clothing 32 of the operator 18. In particular, the attachment portion is a hook fastener while several loop fasteners are fixed to the work clothing 32.

The illumination component 28 comprises a light emitting diode (LED) 34 that is illuminated if the parameter is in a critical range. The display component 30 comprises a Liquid Crystal Display (LCD) 36 that can display several bars. The amount of displayed bars corresponds to the value of the parameters.

As shown in FIG. 5, the display device 24, in particular both the illumination component 28 and the display component 30, includes a receiving unit 38 for receiving the parameters sent by the sending unit 26. A control unit 40 arranged in the display device 24 controls the LCD 36 depending on the parameter forwarded from the receiving unit 38.

Figure 3:
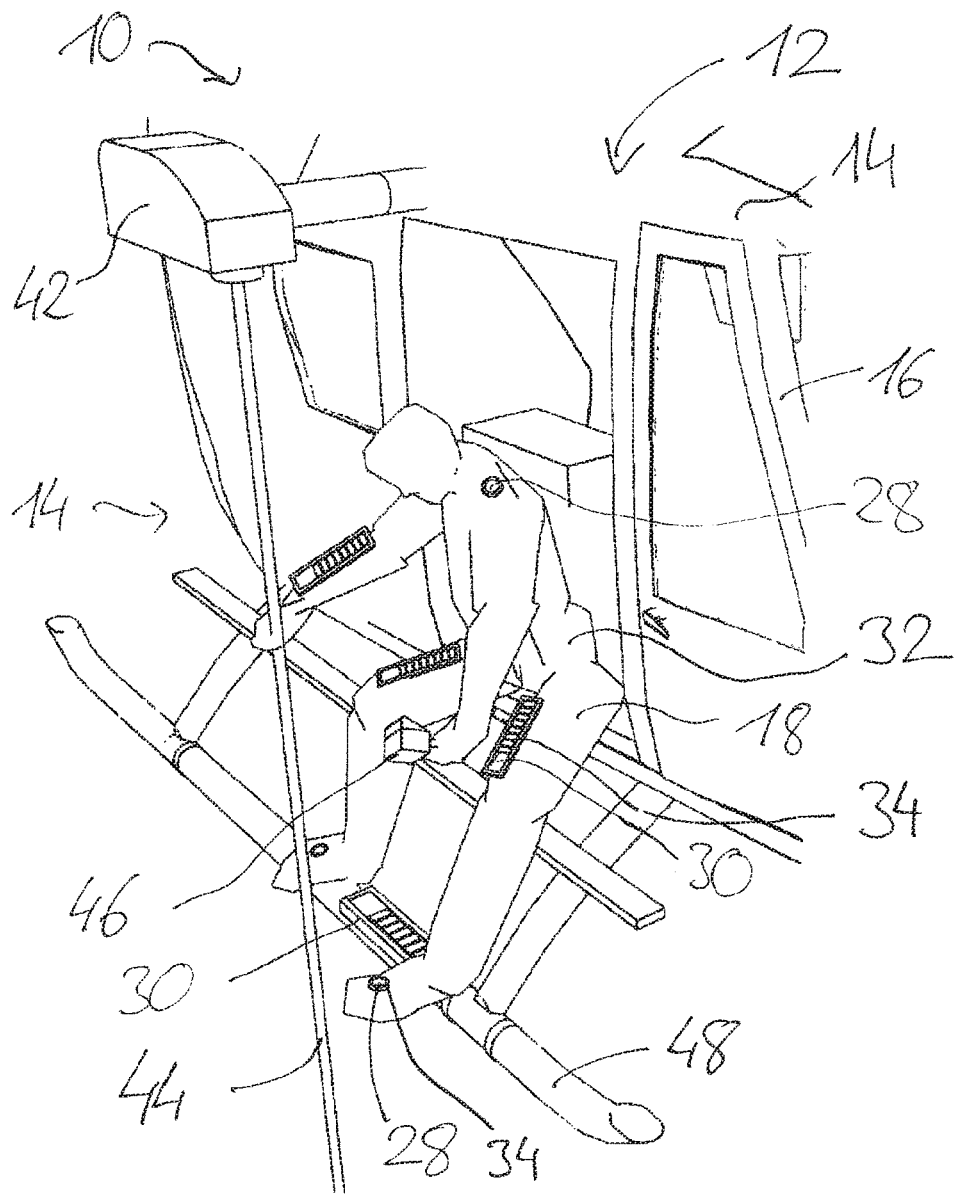
FIG. 3 shows a partial side view of the aircraft while an operator is operating a winch and using the display assembly.
Figure 4:
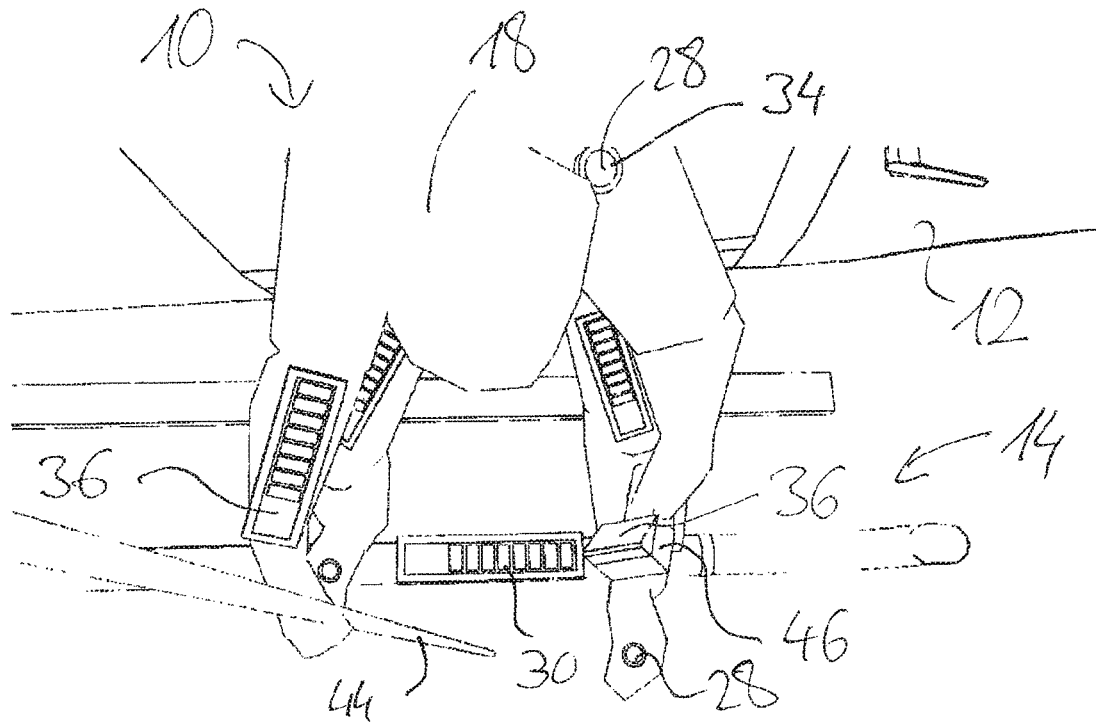
FIG. 4 shows the aircraft of FIG. 3 along the viewing direction of the operator.

FIGS. 3 and 4 show another embodiment of the aircraft assembly 10. The embodiment of the aircraft assembly 10 as shown in FIGS. 3 and 4 is identical to the one shown in FIGS. 1 and 2 except for the following differences:

The aircraft 12 comprises a winch 42 with which a cable 44 can be lowered or raised. The operator 18 operates the winch 42. In the embodiment shown in FIGS. 3 and 4, the display assembly 14 comprises a display device 24 that includes three illumination components 28, four display components 30, and a hand-held component 46. The illumination components 28 are attached to the feet of the operator 18 and to the shoulder of the operator 18. Three display components 30 are attached to an arm and both thighs of the operator 18. The fourth display component 30 is detachably attached to a skid 48 of the aircraft 12. The illumination component 30 attached to the skid 48 is configured such that the operator 18 can stand on the display component 30.

The hand-held component 46 includes an LCD 36 and a grip with which the operator 18 can hold the hand-held components 46 with one hand. Furthermore, the hand-held component 46 comprises a controller for controlling the winch 42.

As especially seen in FIG. 4, the components of the display device 24, i.e., the illumination components 28, the display components 30, and the hand-held components 46, are arranged such that the operator 18 sees the LED 34 and the LCD 36 when monitoring the cable 44 of the winch 42.

The invention is additionally described in the following:

An aircraft operator 18 (pilot, winch operator, load master, etc.) may not have visual access at one glance to all necessary parameters during all phases of flight, especially when looking to the outside of the aircraft 14 and during situations with a high task load. Thus critical information is not available at all times, or the operator 18 must collect information in intervals at non-task-collocated places. For instance, checking the distance to obstacles or gathering parameters, such as flight parameters, while performing tasks at different points of attention. The display assembly 12 offers full range of necessary information at one glance (e.g., flying near to and observing obstacles while monitoring aircraft parameters).

Today, a system which helps during missions in mountains are painted rotor blades. The blades have a signal color on the bottom side so the operator and the pilot can see approximately how far the helicopter is away from rock. Nevertheless, the problem is that an estimation of distances is difficult. At the same time, the operator 18, in particular a pilot, has to observe the avionic instruments.

Head-Up Displays (HUD) and Helmet-Mounted Displays (HMD) are commercially available and have been state of the art for decades. However, crew members not aboard the aircraft or operating in the cabin are not equipped with visual aids and are not connected to aircraft systems. Furthermore, HUDs and HMDs are very expensive and not yet available for civil operations. Complex HMDs are not usable in demanding environmental conditions due to lack of robustness.

Acoustic warnings block the communication between the crew members and warnings are unidirectional alerts from the system to the operator, without the operator being able to access necessary information at all times at one glance.

The technical solution may consist of one or a combination of the following elements:

One or more display components 28, 30, 46 are located in the outside field of view of the operator 18 offering information on certain parameters, such as aircraft or environmental parameters. A possible location may be on top of the skids 48, entrance or ingress steps, multi-purpose pylons and exterior loads, equipment, installations, windows and outer shell.

One or more display components 28, 30, 46 may be located on the work clothing 32 of the respective operator 18 with full connectivity to the related aircraft systems, such as the parameter device 22. The electrical connection may be located next to the person securing points, thus the operator 18 will secure himself and establish the connection of his wearable display at the same time. Possible locations are: gloves, arms, thighs, shoe tips, shoulder.

The displays may be simple LED 34 lights or more complex LCD/OLEO displays 36. It may also be possible to use optical fibers in order to illuminate specific areas of the clothing. The displays may dynamically change their illumination intensity according to the surrounding light conditions, thus ensuring an optimum readability/visibility at all times.

The display shall meet the following requirements:
Enable low cognitive workload
Simple, unambiguous information presentation using intuitive symbology and cues
Robustness against harsh environmental conditions
Synchronized information presentation on all displays in the field of view without distracting the operator
Possible utilization of the whole range of display technologies and types (single LED, LCD, fiber optics)

A helicopter pilot 18 is flying close to a mountain and must observe this obstacle visually by looking outside of a window and keeping a relative distance to an outside reference point. During this operation, he is not able to monitor his screens 22. A wearable display device 24 in his field of view (shoulder, arm, and thigh) shows a simple, intuitive indication about the critical parameters (e.g., engine torque, rate of descent, etc.). If the helicopter's parameters move beyond a certain safety threshold, the display device 24 will immediately show a visual warning in the field of view. The display device's 24 content will modify according to the parameter change.

A helicopter winch operator 18 located in the open aircraft door must control the winch 42 with one hand using the hand-held component 46 while keeping the other hand at the moving cable 44 in order to detect subtle changes in vibration, movement and resistance, whilst manually supporting the cable movement. When operating close to a mountain, the winch operator 18 is also responsible for detecting obstacles, their location, their distance to the helicopter 18 and continuously updating the pilot on obstacles and winch status via Intercom. This demanding task forces the winch operator 18 to permanently scan his environment. The operator 18 has to keep his attention to the downward winched person/load, but must frequently look up and scan the surrounding environment. The winch operator 18 has now a variety of display components 28, 30, 46 in his direct field of view. Some are located on the outside of the aircraft 14, for instance on the skids 48, while others are on his sleeves or gloves. Those display components 28, 30 give an indication of the rotorblade or other aircraft components such as the tailboom or tail rotor distance to the obstacles. If the helicopter's distance to the obstacles moves beyond a certain safety threshold, the display components 28, 30 will immediately show a visual warning in the field of view. The display's content will change according to the distance. This enables the operator 18 to maintain his downward view to the winched person/load while collecting the necessary obstacle information, without being distracted.

The overarching requirement for a robust and simple solution favors straightforward implementation with reliable technologies such as LEDs and hardened LCD displays. The connectivity and electrical power supply will be supported by one plug next to the person securing equipment or wireless and using batteries or accumulators. The underlying data may be collected by sensors or must come from the aircraft avionics.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCES

10 aircraft assembly
12 display assembly
14 aircraft
16 cockpit
18 operator
20 screen
22 parameter device
24 display device
26 sending unit
28 illumination component
30 display component
32 work clothing
34 LED
36 LCD
38 receiving unit
40 control unit
42 winch
44 cable
46 hand-held component
48 skid

The invention claimed is:

1. A display assembly for displaying a parameter of an aircraft, comprising:
   a parameter device for gathering a parameter of at least one of the aircraft or an equipment of the aircraft, including a sending unit for sending the parameter; and
   a detachable non-transparent display device, configured to display the parameter, and comprising a receiving unit for receiving the parameter;
   a work clothing for an operator of the aircraft to which the display device is attached,
   a plurality of display components arranged at different positions of the work clothing and the aircraft so that a display for the parameter is always in a field of view of a pilot or the operator;
   wherein the sending unit is configured to transmit the parameter directly to the receiving unit.

2. The display assembly according to claim 1, wherein the display device comprises a hand-held component.

3. The display assembly according to claim 1, wherein the display device comprises an attachment portion configured for attaching the display device to a work clothing of an operator of the aircraft.

4. The display assembly according to claim 1, wherein the display device comprises an illumination component that is selectively illuminated if the parameter is in a predetermined range.

5. The display assembly according to claim 4, wherein the illumination component includes one or more light emitting diodes.

6. The display assembly according to claim 1, wherein the display device comprises a display component that displays the parameter.

7. The display assembly according to claim 6, wherein the display component includes a liquid crystal display.

8. The display assembly according to claim 1, the sending unit comprising a wireless transmitter, wherein the parameter is wirelessly transmitted between the sending unit and the receiving unit.

9. The display assembly according to claim 1, wherein the parameter device and the display device are arranged in a single component, wherein preferably the parameter device comprises a sensor for measuring the parameter.

10. An aircraft assembly, comprising:
    an aircraft and
    a display assembly for displaying a parameter of the aircraft, comprising:
      a parameter device for gathering a parameter of at least one of the aircraft or an equipment of the aircraft, including a sending unit for sending the parameter; and
      a detachable non-transparent display device, configured to display the parameter, and comprising a receiving unit for receiving the parameter;
    a work clothing for an operator of the aircraft to which the display device is attached,
    a plurality of display components arranged at different positions of the work clothing and the aircraft so that a display for the parameter is always in a field of view of a pilot or the operator;
    wherein the sending unit is configured to transmit the parameter directly to the receiving unit.

11. The aircraft assembly according to claim 10, wherein the aircraft is a helicopter having a skid.

12. The aircraft assembly according to claim 11, wherein the display device is attached to the skid.

13. An aircraft assembly, comprising:
    an aircraft;
    a winch configured to raise and lower a cable;
    a controller for controlling the winch and comprising a hand-held unit;
    a display assembly for displaying a parameter of the aircraft, comprising:
      a parameter device for gathering a parameter of at least one of the aircraft or an equipment of the aircraft, including a sending unit for sending the parameter; and
      a detachable non-transparent display device, configured to display the parameter, and comprising a receiving unit for receiving the parameter;
    a work clothing for an operator of the aircraft to which the display device is attached, a plurality of display components arranged at different positions of the work clothing and the aircraft so that a display for the parameter is always in a field of view of a pilot or the operator;

wherein the sending unit is configured to transmit the parameter directly to the receiving unit.

* * * * *